United States Patent
Serra et al.

(10) Patent No.: US 6,688,620 B2
(45) Date of Patent: Feb. 10, 2004

(54) VEHICLE SUSPENSION WITH CAMBER CONTROL

(75) Inventors: Loic Serra, Tallende (FR); Christian Tetaz, Tallende (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/259,972

(22) Filed: Sep. 27, 2002

(65) Prior Publication Data

US 2003/0071430 A1 Apr. 17, 2003

Related U.S. Application Data

(63) Continuation of application No. PCT/EP01/03399, filed on Mar. 26, 2001, now abandoned.

(30) Foreign Application Priority Data

Mar. 27, 2000 (FR) ............................................. 00 03929
Jan. 23, 2001 (FR) ............................................. 01 01180

(51) Int. Cl.[7] ................................................. B60G 3/26
(52) U.S. Cl. .......................... 280/124.135; 280/124.15; 280/5.521
(58) Field of Search ............................ 280/5.508, 5.09, 280/5.51, 5.521, 5.52, 86.751, 86.757, 124.135, 124.136, 124.138, 124.139, 124.143, 124.15, 124.106

(56) References Cited

U.S. PATENT DOCUMENTS

| | | |
|---|---|---|
| 2,071,577 A | 2/1937 | Renwick et al. |
| 2,689,747 A | 9/1954 | Kolbe |
| 3,137,513 A | 6/1964 | Marot |
| 3,497,233 A | 2/1970 | Bolaski, Jr. |
| 3,729,210 A | 4/1973 | Cunningham, Jr. |
| 4,373,743 A | 2/1983 | Parsons, Jr. |
| 4,515,390 A | 5/1985 | Greenberg |
| 4,550,926 A | 11/1985 | MacIsaac |
| 4,700,972 A | 10/1987 | Young |
| 4,835,714 A * | 5/1989 | Sano et al. .............. 280/5.521 |
| 5,116,069 A | 5/1992 | Miller |
| 5,205,580 A * | 4/1993 | Luger et al. ............. 280/86.75 |
| 5,292,149 A * | 3/1994 | Luger ...................... 280/5.521 |
| 5,306,034 A | 4/1994 | Buchanan |
| 5,346,241 A * | 9/1994 | Lee ...................... 280/124.135 |
| 5,451,073 A * | 9/1995 | Inoue .................... 280/124.15 |
| 5,558,360 A * | 9/1996 | Lee ...................... 280/124.138 |
| 5,580,089 A | 12/1996 | Kolka |
| 5,700,025 A | 12/1997 | Lee |
| 5,821,434 A | 10/1998 | Halliday |
| 6,170,838 B1 | 1/2001 | Laurent et al. |
| 6,250,649 B1 | 6/2001 | Braun |
| 6,406,036 B1 | 6/2002 | Laurent et al. |

FOREIGN PATENT DOCUMENTS

| | | |
|---|---|---|
| DE | 4029288 | 3/1991 |
| DE | 4102313 | 7/1992 |
| DE | 4135585 | 5/1993 |
| DE | 19608578 | 9/1997 |
| DE | 19649245 | 6/1998 |
| DE | 19717418 | 10/1998 |
| EP | 0878378 | 11/1998 |
| EP | 1070609 | 1/2001 |

(List continued on next page.)

*Primary Examiner*—Peter C. English
(74) *Attorney, Agent, or Firm*—Baker Botts L.L.P.

(57) ABSTRACT

A vehicular suspension device comprises a wheel carrier which is articulated relative to the suspension elements. This connection is provided by rigid connection rods. This additional degree of freedom permits variation of the camber angle independently of the suspension spring movement and of the deformations of its elements. The variation of the camber is preferably controlled by the forces sustained by the wheel in the ground contact area of the tire. This is obtained by a configuration in which the movements of the wheel relative to the body of the vehicle allow an instantaneous center of rotation which is situated beneath the plane of the ground.

12 Claims, 7 Drawing Sheets

FOREIGN PATENT DOCUMENTS

| | | |
|---|---|---|
| FR | 967710 | 11/1950 |
| FR | 1108823 | 1/1956 |
| FR | 1252770 | 2/1961 |
| FR | 2004863 | 12/1969 |
| FR | 2745757 | 9/1997 |
| GB | 434330 | 8/1935 |
| GB | 1213795 | 11/1970 |
| GB | 1526970 | 10/1978 |
| GB | 2310838 | 9/1997 |
| JP | 02306808 A * 12/1990 | ............ B60G/7/00 |
| JP | 02306810 A * 12/1990 | ............ B60G/7/00 |
| JP | 06156034 A * 6/1994 | ............ B60G/7/00 |
| WO | 9637375 | 11/1996 |
| WO | 02058949 | 8/2002 |

* cited by examiner fig. 1 fig. 2 fig. 4 fig. 6 fig. 5 fig. 8 fig. 7 fig. 9 fig. 10

# VEHICLE SUSPENSION WITH CAMBER CONTROL

CROSS REFERENCE TO RELATED APPLICATIONS

This is a continuation of international application PCT/EP01/03399 filed Mar. 26, 2001, now abandoned, which was published in French on Oct. 4, 2001 as international publication WO 01/72572 and which claims priority of French applications 00/03929 filed Mar. 27, 2000 and 01/01180 filed Jan. 23, 2001.

BACKGROUND OF THE INVENTION

1. Field of the Invention

The present invention relates to chassis systems for vehicles, in particular suspension devices, and more particularly the guidance of the wheels. Suspension devices have two main functions which must be fulfilled simultaneously at any moment during operation. One of these functions is that of suspending the vehicle, that is to say, permitting substantially vertical oscillations of each wheel in accordance with the load applied to the wheel. The other function of these devices is that of guiding the wheel, that is to say, controlling the angular position of the wheel plane.

2. The Related Art

The term "wheel plane" refers to the plane, associated with the wheel, which is perpendicular to the axis of the wheel and which passes through the center of the contact area with the ground. The angular position of the wheel plane with respect to the body of the vehicle is defined by two angles, the camber angle and the steering angle. The camber angle of a wheel is the angle separating, in a transverse plane perpendicular to the ground, the wheel plane from the mid-plane of the vehicle. This angle is positive when the upper part of the wheel deviates from the mid-plane towards the outside of the vehicle, this being commonly termed "camber" or "positive camber". Conversely, when this angle is negative, the term used is "counter-camber" or "negative camber". The steering angle of a wheel is the angle separating, in a horizontal plane parallel to the ground, the wheel plane from the mid-plane of the vehicle.

On most vehicles, the camber angle ("camber" or "camber angle" will be used without distinction hereinbelow) is fixed for a particular position of the suspension and the steering; that is to say, that theoretically it cannot vary independently of the suspension deflection or the steering. However, it undergoes variations induced by the deformations of the elements constituting the suspension device caused by the forces exerted on the wheel by the ground. These variations may be considerable. For example, an ordinary passenger car experiences camber variations of several degrees under the transverse forces developed on the tire on a curve, irrespective of the contribution of the rolling of the vehicle body (which generally tilts in the same direction under the effect of centrifugal force). This "elastic" variation of the camber causes the camber to increase (the camber tends towards positive values) for the outer wheel on the curve. Conversely, the camber decreases (it tends towards negative values) for the inner wheel on the curve. For a long time, these predictable variations have been incorporated in the design and adjustment compromises of the suspension devices of ordinary vehicles in order to limit the harmful effects which they have on the functioning of the chassis system.

The camber has a great influence on the behavior of the vehicle and the performance of the chassis system. In particular, the performance of a tire is very variable depending on the configuration of its contact area with the ground, which configuration depends largely on the camber. The choice of the static camber angle is based mainly on these variations. Thus, for example, a large negative static camber is generally introduced on a racing vehicle in order to compensate for the variations due to the deformations of the tire under transverse force, as well as the suspension elements, even though they are much more rigid than on passenger cars, and due to the rolling of the body. This configuration is both useful and acceptable in racing, since the criteria of grip on cornering are a major concern here. In contrast, on a passenger car, since the wear of the tires and the straight-line stability have more weight in the compromise being sought, a very slightly negative initial static camber is chosen. It is necessary to accept reduced slip thrusts when the deformations of the tire and the elements of the ground contact system under the lateral forces have their effects on the positioning of the wheel plane added to the effects of the rolling of the vehicle.

In order to optimize the camber, in particular during transverse accelerations, suspension devices whose camber varies in accordance with the vertical deflection of the wheel have been designed. In this way, the rolling experienced by the body of the vehicle can induce a useful variation of the camber which partly or totally compensates for the inclination of the body of the vehicle and the deformations described above. This is the case of the so-called "multi-link" systems. These devices require a specific design and vehicle architecture, which cannot be implemented on most current vehicles for reasons of space requirement and cost. These systems react only to the consequence (deflection, rolling) of a transverse acceleration and not to the forces which cause it, thereby, on the one hand, delaying the effect of the correction. Moreover, to permit a sufficient variation of the camber, the kinematics of these systems require displacements of the position of the contact area with respect to the vehicle, called "track changes", and these variations can also create difficulty. The range of camber corrections made possible by such systems is therefore relatively limited when the compromise necessary for the correct functioning of the other load cases, such as travelling on a bumpy road, unilateral or in contrast simultaneous bouncing, is to be observed.

From the point of view of kinematics, in terms of degrees of freedom, suspension devices generally have only one degree of freedom (of the wheel or wheel carrier with respect to the vehicle). This degree of freedom permits vertical suspension movements which, as explained above, can be combined with limited camber variations.

Systems are known, however, in which the control of the camber is active; that is to say, the geometry modifications are controlled by movements of actuating cylinders, as described, for example, in the United States patent documents U.S. Pat. Nos. 4,515,390, 4,700,972 and German patent document DE 19717418. In these systems, at least a certain degree of additional freedom controlled by actuators has been permitted. These systems are very specific, since they cannot be used in the most ordinary vehicles, in particular because of their space requirement and the considerable power necessary for the actuators.

SUMMARY OF THE INVENTION

An object of the invention is a device of simple construction, which allows control of the camber without added energy, or with limited added energy, substantially independently from the vertical oscillations of the suspension and, more generally, of the movements of the body of the vehicle, and which makes it possible to minimize the track variations.

This object is achieved by a support device which is designed to connect a wheel to suspension elements of a vehicle, wherein the wheel, of a radius "R", is designed to be supported on the ground, and the support device comprises camber means which provide the wheel with a degree of freedom of camber relative to the suspension elements. The support device is configured such that, about a mean position, the wheel allows a first instantaneous center of rotation, which is situated in an interval ranging from 0.5 R above the ground to R beneath the ground. In fact, this support device replaces the rigid wheel carrier according to the state of the art. The term "suspension elements" means the elements which assure that the load is carried and impart the generally vertical suspension movement to the wheel, such as the arms, springs, shock absorbers or anti-roll connections.

Preferably, the first instantaneous center of rotation is situated beneath the plane of the ground.

Also preferably, the first instantaneous center of rotation is situated transversely beneath the contact area.

According to one embodiment, the support device is configured such that it is close to equilibrium in the mean position, in the absence of transverse force exerted by the ground on the wheel in the contact area. This equilibrium can be unstable equilibrium.

Preferably, the first instantaneous center of rotation is situated substantially in the plane of the wheel.

Preferably, the support device according to the invention comprises a wheel carrier, and is designed to be connected to an intermediate support, the intermediate support constituting one of the suspension elements.

According to one embodiment, the wheel carrier is connected to the intermediate support by connection rods which are configured so as to allow the camber movement of the wheel carrier by instantaneous movement of rotation of the wheel carrier relative to the intermediate support.

According to another embodiment, the degree of camber freedom is provided by resilient deformations of deformable elements which connect the wheel carrier to the suspension elements.

The suspension elements may comprise a Mac Pherson strut.

The support device according to the invention can additionally comprise means for control which can affect the camber of the wheel. These means for control can comprise a resiliently deformable element which opposes the camber movement, this resiliently deformable element preferably consisting of elastomer articulations.

The invention also relates to a suspension device for a vehicle, comprising the above-described support device.

Such suspension device is designed to connect a wheel carrier to a body of a vehicle, which wheel carrier is designed to support a wheel, of a radius "R", designed to be supported on the ground through a contact area, and comprises means which provide the wheel carrier, relative to the body, with a degree of freedom of camber and a degree of freedom of suspension movement which are independent from one another. The suspension devise is configured such that the camber movement of the wheel carrier, about a mean position, relative to the body, allows a second instantaneous center of rotation, which is situated in an interval ranging from 0.5 R above the ground to R beneath the ground. The suspension device according to the invention comprises two degrees of freedom, which permit independent movements of suspension and camber. The camber movement of the wheel (or of the wheel carrier) takes place about a second instantaneous center of rotation, which is situated at a limited distance from the contact area, in order to limit the track variations during the process of camber or counter-camber and to limit the energy necessary in the case of active control of the camber.

According to a preferred embodiment, the instantaneous center of rotation is situated in an interval ranging from 0.2 R above the ground to 0.4 R beneath the ground, and more preferably, from 0.1 R above the ground to 0.3 R beneath the ground.

In order to assure stable functioning, the device is preferably configured such that it is close to equilibrium in the mean position in the absence of transverse force exerted by the ground on the wheel in the contact area. More preferably, it is configured such that, in the absence of variations of camber, the transverse force exerted by the ground on the wheel in the contact area, generated during the suspension spring movement, does not exceed a limit corresponding to 0.3 P, where P is the weight of the vehicle.

A preferred embodiment of the invention comprises an intermediate support, which is connected firstly to the body and secondly to the wheel carrier, and wherein the connection of the intermediate support to the wheel carrier permits the degree of freedom of camber and the connection of the intermediate support to the body permits the degree of freedom of suspension spring movement.

In order to permit passive functioning, the second instantaneous center of rotation of the movement of the wheel carrier relative to the body of the vehicle can preferably be situated beneath the plane of the ground, so that transverse forces exerted by the ground on the wheel, in the contact area, induce inclination of the wheel carrier relative to the body in the direction of a decrease of camber, when the transverse forces are directed towards the interior of the vehicle, and in the direction of an increase of camber, when the said transverse forces are directed towards the exterior of the vehicle. In this case of passive functioning associated with the transverse forces, the device can comprise a means for measurement of the camber movement of the wheel carrier, in order to deduce the transverse forces.

In certain conditions, it may be necessary or advantageous to provide in addition means for control which can affect the camber of the wheel. These means can comprise a resiliently deformable element which opposes the camber movement, the deformable element consisting, for example, of elastomer articulations.

Preferably, the degree of freedom of camber can be controlled by an active means, according to running parameters of the vehicle.

Finally, the invention relates to a vehicle which is equipped with such a suspension device.

BRIEF DESCRIPTION OF THE DRAWINGS

Several embodiments of the invention are described hereinafter by reference to the accompanying drawings to illustrate and explain the characteristics and principles of invention. It will be appreciated that many other embodiments of the invention are possible, as suggested by the many variants presented. In the drawings.

DESCRIPTION OF EXEMPLARY EMBODIMENTS

Figure 1:
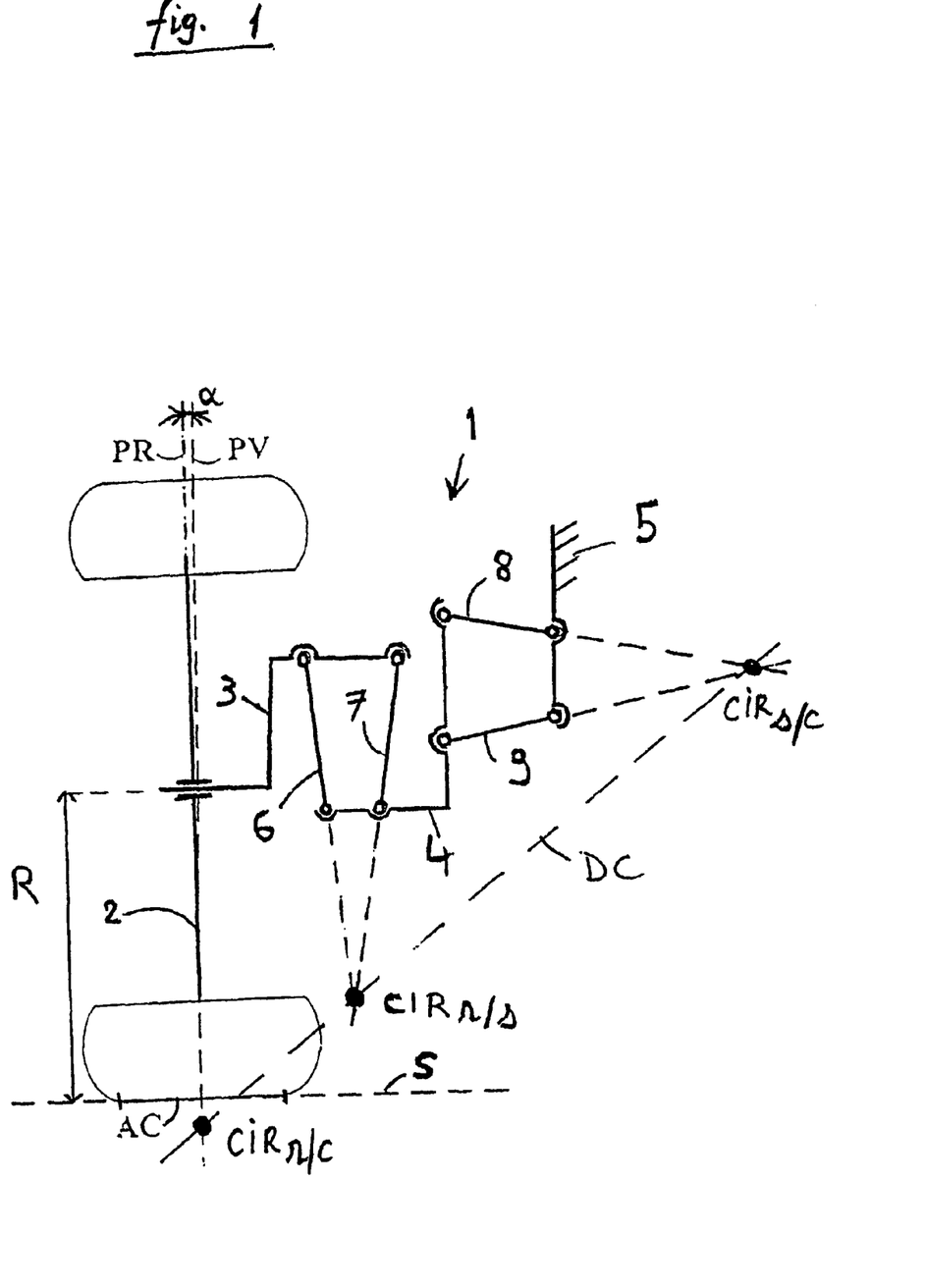
FIG. 1 is a schematic functional diagram of a device according to the invention.

FIG. 1 represents in a flat longitudinal view the principle of a suspension device according to the invention. This flat representation (i.e. in two dimensions) is very convenient, since it shows clearly how the device according to the invention is distinguished from the devices according to the state of the art.

The suspension device 1 comprises a wheel carrier 3, which is designed to maintain the plane PR of a wheel 2 relative to the body 5 of a vehicle. The wheel, which has a radius "R", is supported on the ground S through its contact area AC. The wheel carrier 3 is connected to the body 5 by means (4, 6, 7, 8, 9) which allow it two degrees of freedom. The camber movement of the wheel is permitted by a connection of the wheel carrier 3 to an intermediate support 4 by connection rods 6 and 7. The suspension spring movement is permitted by a connection of the intermediate support 4 to the body 5, by upper 8 and lower 9 arms (or triangles). Thus, the suspension device is configured so as to provide the wheel carrier 3 with a degree of freedom of camber relative to the body 5, since the wheel carrier 3 can be inclined relative to the body 5, and with a degree of freedom of suspension movement, since the wheel carrier 3 can carry out substantially vertical movements in a known manner, for example, in the manner of "multi-arm" or "double triangle" systems.

The movement of the wheel carrier 3 relative to the intermediate support 4 allows a first instantaneous center of rotation (CIR r/s). The movement of the wheel carrier 3 relative to the body allows under transverse force a second instantaneous center of rotation (CIR r/c). The movement of the intermediate support 4 relative to the body 5 allows a third instantaneous center of rotation (CIR s/c). By applying the conventional hypothesis of a point connection of the wheel 2 to the ground S, the theory of the co-linearity of the instantaneous centers of rotation (CIR r/c) in a flat movement, makes it possible to locate the second instantaneous center of rotation (CIR r/c) of the camber movement at the intersection of the plane of the wheel PR and the straight line DC which contains the first and third instantaneous centers of rotation. This kinematic theory is in common use in the field of suspension systems. It can thus be understood that it is the selection of the configuration, i.e. of the dimensions and orientation of the different elements which constitute the suspension device which (by defining the positions of the characteristic axes) make it possible to obtain a given position of the second instantaneous center of rotation (CIR r/c) of the camber movement of the wheel carrier 3 relative to the body 5 under transverse force.

FIG. 1 represents the suspension device in an mean position, which can be defined as the position which corresponds to running in a straight line on flat ground with the vehicle carrying its nominal load. The static camber is represented here by the angle $\alpha$ formed by the plane of the wheel PR with the plane PV which passes through the center of the contact area and which is parallel to the median plane of the vehicle. This figure shows the kinematic functioning of the device according to the invention. It will be appreciated that the static equilibrium of the forces sustained by the system (weight of the vehicle, forces applied by the ground to the wheel, suspension springs) must be assured by the design of the system. In particular, the points of anchorage and the directions of thrust of the springs which support the load are selected for this purpose. In addition, stiffness can be used in the articulations, so as to control the angle of static camber by means of the position of the wheel carrier 3 relative to the intermediate support 4. This stiffness can be provided by resilient articulations or by additional springs.

Figure 2:
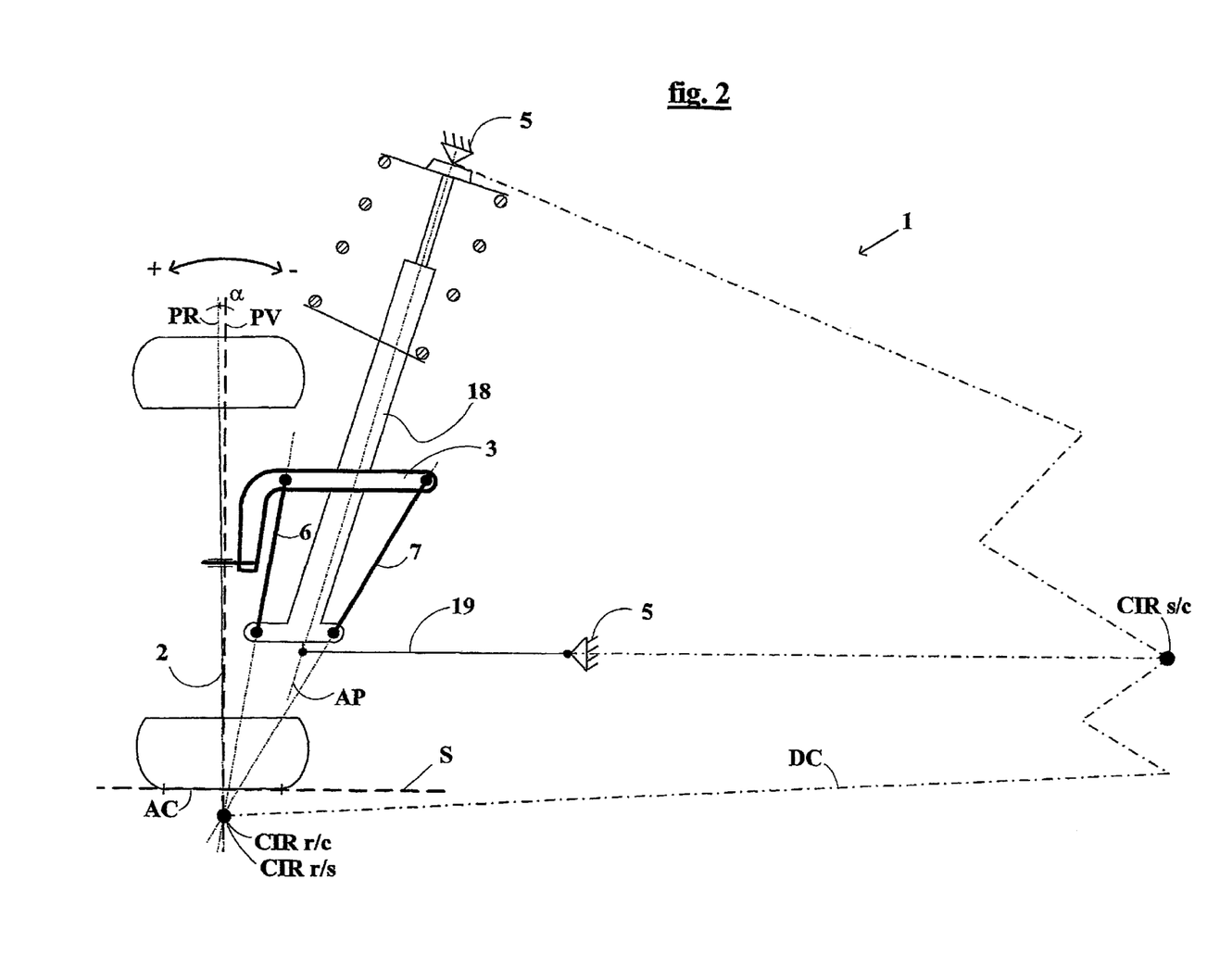
FIG. 2 is a schematic diagram of a first embodiment of the invention, in a longitudinal view.

FIG. 2 represents an embodiment of the suspension device according to the invention. In this example, the suspension spring movement is assured by a Mac Pherson strut 18 and a lower arm or triangle 19. The pivot axis AP is the axis around which the strut 18 pivots, in order to allow the vehicle to be steered in a known manner. A wheel carrier 3 is articulated on the strut 18 by connection rods 6 and 7. In this embodiment, the strut 18 constitutes the intermediate support 4 of FIG. 1. In addition, the first instantaneous center of rotation (CIR r/s) of the movement of the wheel carrier 3 relative to the intermediate support 18 is at the intersection of the axes of the connection rods 6 and 7, beneath the contact area AC, and substantially in the plane of the wheel PR, which constitutes a preferred configuration. On the basis of the aforementioned principle of co-linearity, the second instantaneous center of rotation of camber (CIR r/c) is located in the same place as the first instantaneous center of rotation (CIR r/s) of the movement of the wheel carrier 3 relative to the intermediate support/strut 18. This configuration has perfectly stable equilibrium; i.e. even in the absence of stiffness in the articulations of the connection rods 6, 7 (as is the case for mechanical shafts or ball joints), the device is in equilibrium in its mean position in the absence of transverse force exerted by the ground (S) on the wheel in the contact area (AC). In practice, taking into account the various resilient elements such as the tire, a configuration which is close to theoretical equilibrium can be satisfactory in terms of functioning. Experiments have shown that when the position of the first instantaneous center of rotation (CIR r/s) relative to the center of the wheel forms an angle of less than 15° with the plane of the wheel, this condition can be met.

Figure 3:
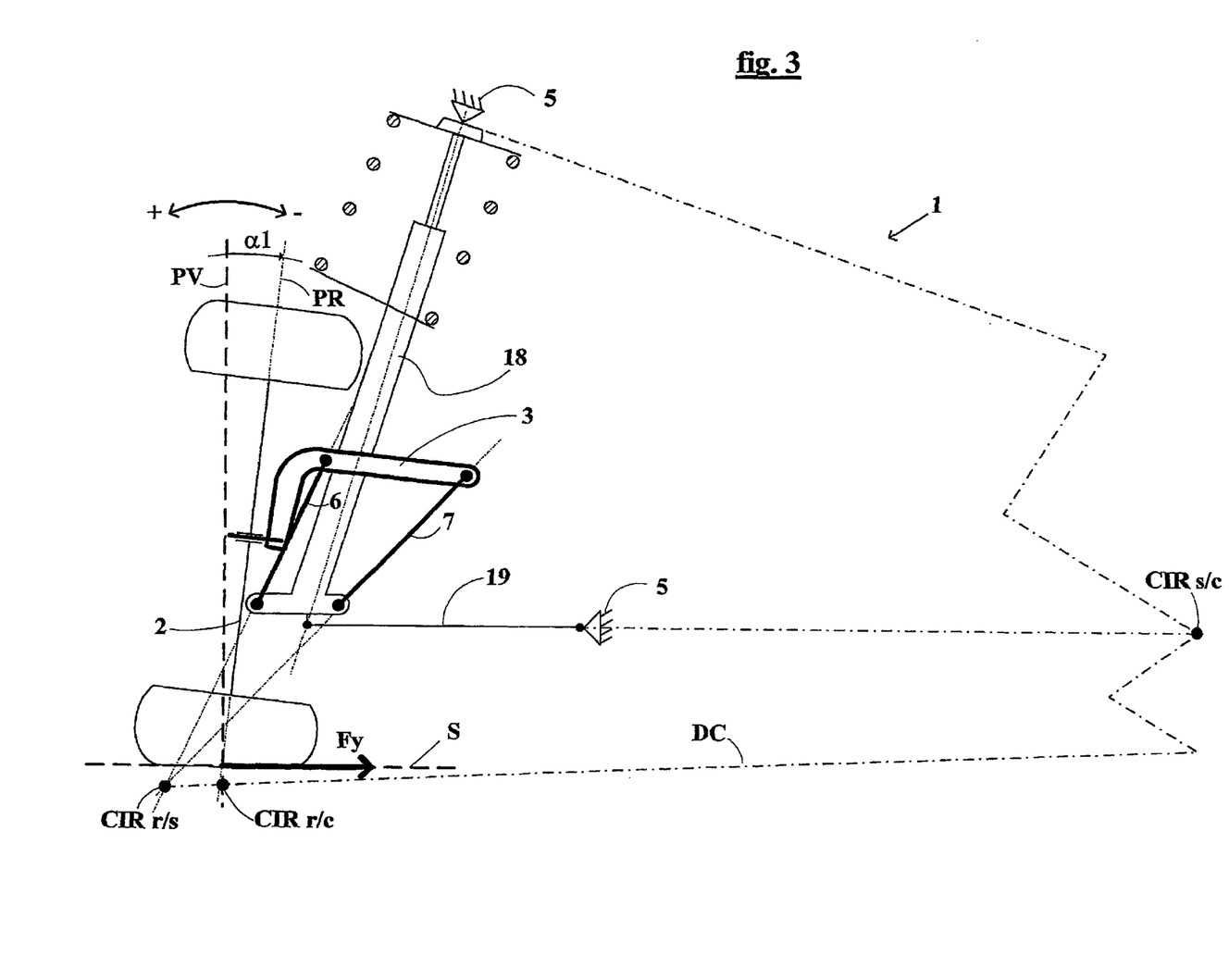
FIG. 3 is a schematic diagram of the device in FIG. 2, in a longitudinal view, when it is subjected to a transverse force.

FIG. 3 represents the embodiment of FIG. 2 when the wheel 2 is subjected in the contact area (AC) to a force, the transverse component Fy of which is oriented towards the interior of the vehicle. This is the case for the wheel which is on the outer side of the vehicle in a curve. The fact that the second instantaneous center of rotation (CIR r/c) of the camber movement is situated beneath the plane of the ground (S) implies that the component Fy generates a torque which tends to make the wheel carrier 3 pivot in the same direction as Fy. This rotation takes place in the direction of counter-camber (i.e. the angle of camber $\alpha$ 1 decreases, tending towards negative values). It will be appreciated that when the wheel 2 is subjected to a force, the transverse component of which is oriented towards the exterior of the vehicle (which is the case for the wheel which is on the inner side of the vehicle in a curve), the component Fy generates a torque which tends to make the wheel carrier 3 pivot in the direction of an increase of camber (i.e. the angle of camber α 1 increases, tending towards positive values). Since the first instantaneous center of rotation (CIR r/s) is the point of intersection of the axes of the connection rods (6, 7), which define the kinematic mechanism for the movements of the wheel carrier 3 relative to the strut 18, the position of this point is variable during camber movements of the wheel carrier 3, as can be seen by comparing FIGS. 2 and 3. It can also be seen, however, that the position of the second instantaneous center of rotation (CR r/c) of the camber movement of the wheel carrier 3 relative to the body 5 of the vehicle varies less. This slight variation of the position of the second instantaneous center of rotation (CIR r/c) during the movements of camber can be used to vary progressively the torque generated by the transverse forces in the contact area. In the example in FIG. 3, this effect stabilizes the system, since the torque which generates the camber tends to decrease when the camber departs from its mean value, owing to the decrease in the distance between the second instantaneous center of rotation (CIR r/c) and the ground, which constitutes the lever, to which the transverse force Fy is applied.

For the sake of convenience, FIG. 3 represents the variation of camber of the wheel 2 generated by a transverse force Fy in the case of an "ideal" vehicle, i.e. a vehicle which is perfectly rigid. In reality, on most vehicles currently available, a transverse force also generates roll (i.e. inclination of the reference plane PV) of the body towards the exterior of a curve, which tends to incline the plane of the wheel PR towards the exterior of the curve (see above). In this case, these two effects are inverse. Thus, the variation illustrated in FIG. 3 must be considered relative to the body 5, i.e. to the plane PV which is associated with the body 5. It will be appreciated that in order to determine the position of the wheel relative to the ground, it is necessary to integrate the variation induced by the roll (and also by the deformations of the different elements of the suspension system).

Figure 4:
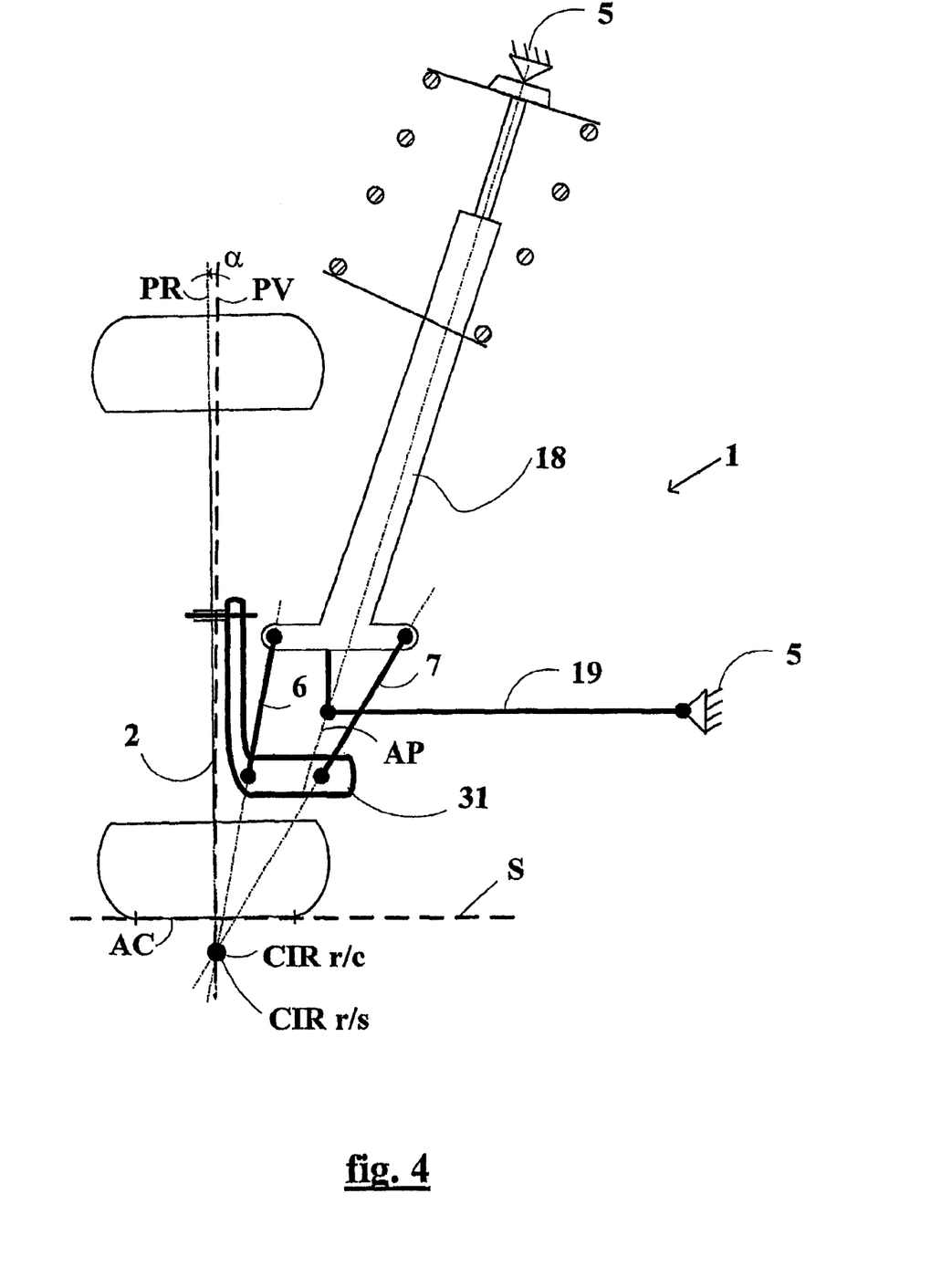
FIG. 4 is a schematic diagram according to a second embodiment of the invention.

FIG. 4 represents a configuration which is different from FIG. 2, but which uses similar elements. The difference consists in the fact that since the wheel carrier 31 is situated beneath the points of connection to the strut 18, the connection rods 6 and 7 work with compression. Thus, the equilibrium of the wheel carrier is an unstable equilibrium, whereas is it stable in the case in FIG. 2. An advantage of this instability is that it is possible to obtain greater sensitivity around the mean position. In order to permit direct comparison with the other figures, the instantaneous centers of rotation (CIR r/s, CIR s/c, CIR r/c) have the same positions (in the mean position of the wheel). However, as in the case for the first mode, this is only an example, and an infinite number of configurations is possible, as shown and described in connection with FIG. 1.

Figure 5:
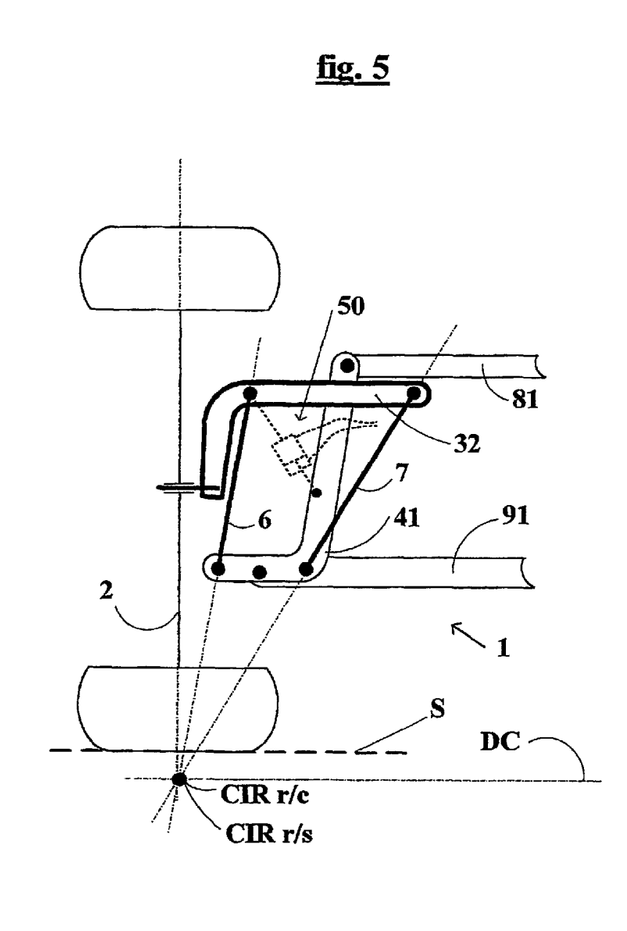
FIG. 5 is a schematic diagram according to a third embodiment of the invention.

FIG. 5 shows an architecture similar to that in FIG. 1. In fact, the degree of freedom of suspension movement is assured in this case by a "multi-arm" or "double triangle" system, which in itself is known. In this example, since the arms 81 and 91 are parallel to one another and horizontal, the straight line DC which contains the instantaneous centers of rotation is also horizontal. This device differs from that of FIG. 1 in that, according to a preferred embodiment which is similar to that of FIGS. 2 and 3, the first instantaneous center of rotation (CIR r/s) of the movement of the wheel carrier 32 relative to the intermediate support 41 is positioned substantially in the plane of the wheel PR, for the mean camber position of the wheel 2. Thus, this point also constitutes the second instantaneous center of rotation (CIR r/c) of the camber movement of the wheel carrier 32 relative to the body. A means for active or passive control 50, in the form of a jack which can impose or limit the variations of camber, is also shown in broken outline. In the case of active control, the position of the second instantaneous center of rotation (CIR r/c) of the camber movement is advantageously situated at the level of the ground S, or above this level, but at a shorter distance, in order to permit control with low energy, and to limit the track variation caused by the movements of the wheel plane PR.

On the other hand, the means for control can have a passive role of regulating the camber movements, which, for example, are caused by the transverse forces as shown in FIG. 3.

Whether it is active or passive, if it can be piloted, the means for control can be controlled according to various running parameters of the vehicle (for example, longitudinal or transverse acceleration, position of the steering wheel, roll of the body, yaw sensor, forces on the wheels, type of driving, handling selected by the driver).

According to a similar structure, the means for control can be replaced by a means for measurement of the movements of camber. In the case of movements of camber which are caused by transverse forces, this measurement makes it possible to determine these forces by means of known methods. The advantages of a system for measurement of this type is that it is based on a substantial displacement, which can not be compared with the displacements measured, for example, by strain gauges which are sometimes implanted on the suspension elements. This determination of the transverse forces is useful, for example, in order to pilot systems for safety or regulation of the vehicle handling.

Figure 6:
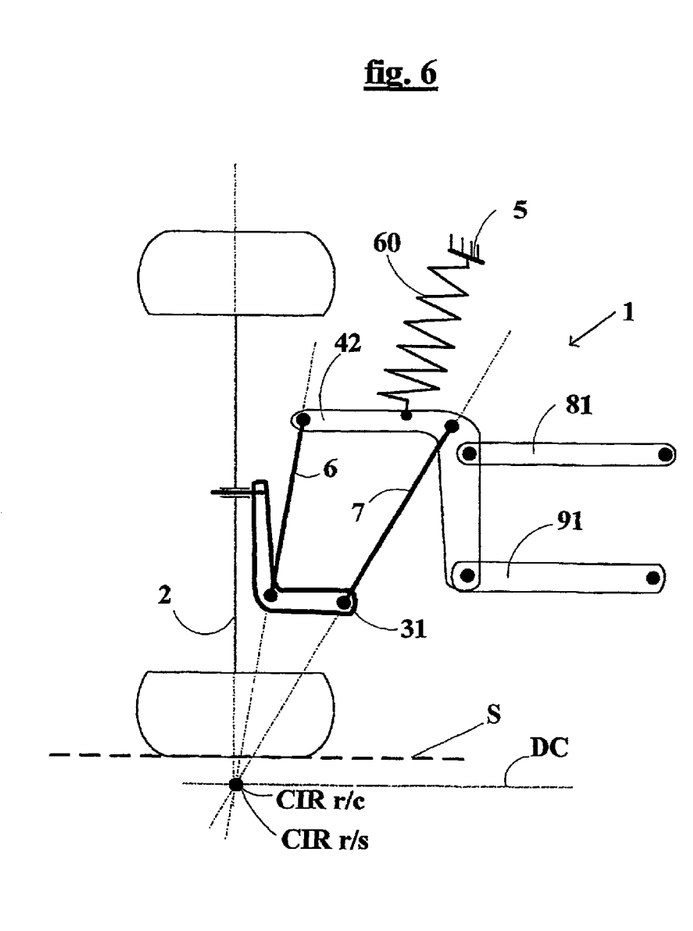
FIG. 6 is a schematic diagram according to a fourth embodiment of the invention.

FIG. 6 represents a device which is comparable to that in FIG. 5 in terms of kinematic mechanism, but is different in terms of stability of the equilibrium, as described for FIG. 4. In this case, the connection rods 6, 7 work with compression between the wheel carrier 31 and the intermediate support 42. The suspension spring 60 is shown supported on the intermediate support 42, but it will be appreciated that it can be supported on the wheel carrier 31 or on one of the upper 81 or lower 91 arms, as in the known suspension systems.

Figure 7:
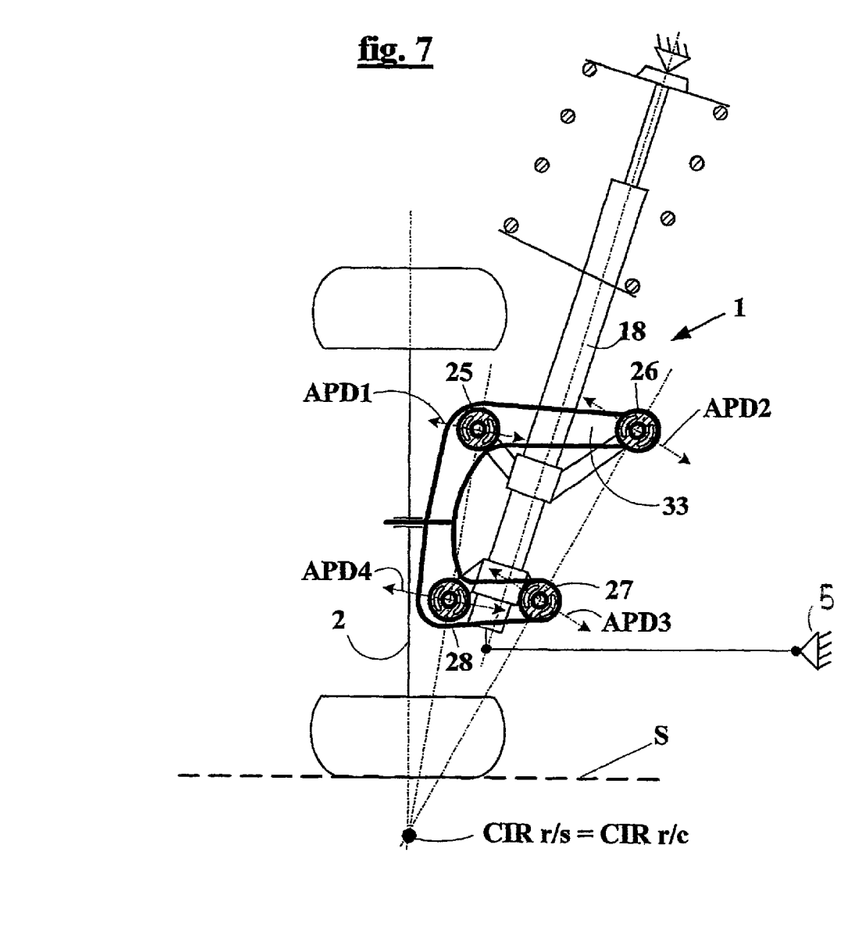
FIG. 7 is a schematic diagram according to a fifth embodiment of the invention.
Figure 8:
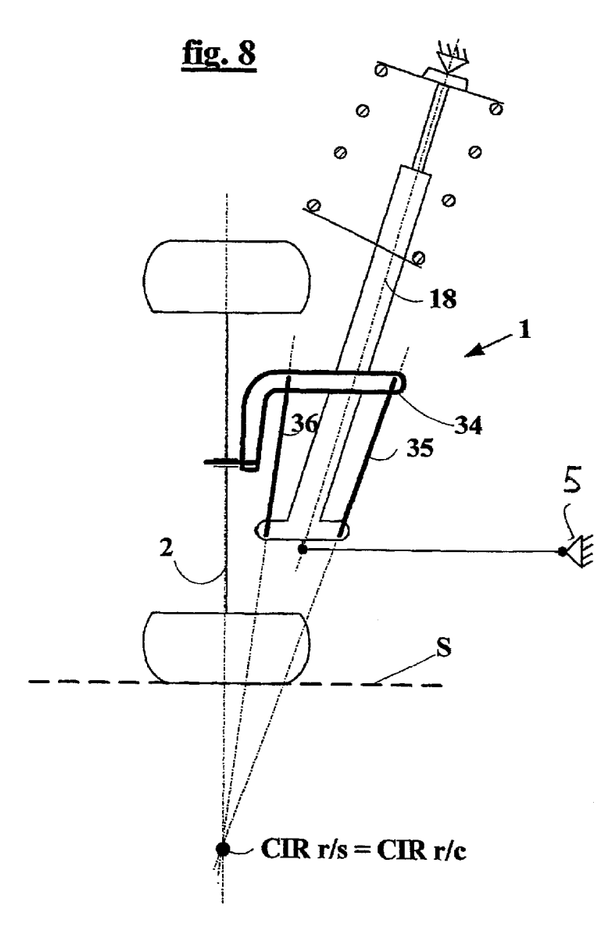
FIG. 8 is a schematic diagram according to a sixth embodiment of the invention.

FIGS. 7 and 8 represent alternative embodiments of the invention.

The device in FIG. 7 comprises a wheel carrier 33, which is connected by deformable elements 25, 26, 27, 28 to the strut 18, which in this case constitutes the intermediate support. In this case, the deformable elements are elastomeric articulations. The specific distribution of the radial stiffness of these articulations according to the azimuth makes it possible (for short displacements) to create a connection in the way of a slide joint, according to the preferential axes of deformation (APD1, APD2, APD3, APD4). The arrangement of the articulations 25, 26, 27, 28, and therefore of these slide joints, provides the wheel carrier 33, relative to the suspension elements, with the required kinematic mechanism as well as with the stiffness and stop functions which are advantageous for controlling the device. The first instantaneous center of rotation (CIR r/s) of the movement of the wheel carrier 33 relative to the strut 18 is situated at the intersection of the lines which are perpendicular to the preferential axes of deformation (APD1, APD2, APD3, APD4). This configuration generates an amplitude of camber which is sufficient for most applications, and participates in filtering out vibrations in the suspension of the vehicle. In the example illustrated here, the specific distribution of the radial rigidity is obtained by the presence of recesses along the preferential axes of deformation in the elastomeric sleeves of the articulations 25, 26, 27, 28, but a person skilled in the art of elastomeric articulations is familiar with various other solutions, according to the specifications for these articulations. In this position, the second instantaneous center of rotation (CIR r/c) of the movement of the wheel carrier 33 relative to the body 5 of the vehicle is combined with the first instantaneous center of rotation (CIR r/s), as shown in FIG. 2.

In the case of FIG. 7, four elastomeric articulations are represented, but this number is arbitrary, since two could suffice. In addition, the connection of the wheel (or of the wheel carrier) to the strut must also assure the steering of the wheel plane. For example, in order to provide satisfactory steering rigidity, it is possible to use a wheel carrier which consists of two parallel, spaced planes, disposed on both sides of the strut, each of these two planes having the features described in FIG. 7.

FIG. 8 represents an architecture which is similar to that of FIG. 2. Here, however, deformable parts 35, 36 which, by means of their own flexibility rather than by means of a pivoting connection, provide the required degree of freedom of camber. In this case, two flexible pieces are shown, but this number is arbitrary. The connections between these deformable parts 35, 36, the wheel carrier 34, and the strut 18 are rigid. An advantage of this solution is that it eliminates the articulations which are needed in the embodiments in FIGS. 2 to 6. The deformable parts 35, 36 can be made of metal, or of composite material. It is also possible to manufacture these deformable parts 35, 36, the wheel carrier 34, and the means for connection to the suspension strut 18 in a one-piece manner, and to obtain the required kinematics mechanism by means of adequate distribution of the stiffness within this single part. In this case, use of a composite material may be advantageous. In this example, there is shown a first instantaneous center of rotation (CIR r/s) of the movement of the wheel carrier 34 relative to the intermediate support/strut 18, which is situated approximately 0.75 R beneath the ground S. This configuration makes the system more sensitive to the transverse forces sustained by the wheel in the contact area. In this position, the second instantaneous center of rotation (CIR r/c) of the movement of the wheel carrier 34 relative to the body 5 of the vehicle is combined with the first instantaneous center of rotation (CIR r/s), as explained in connection with FIG. 2.

Figure 9:
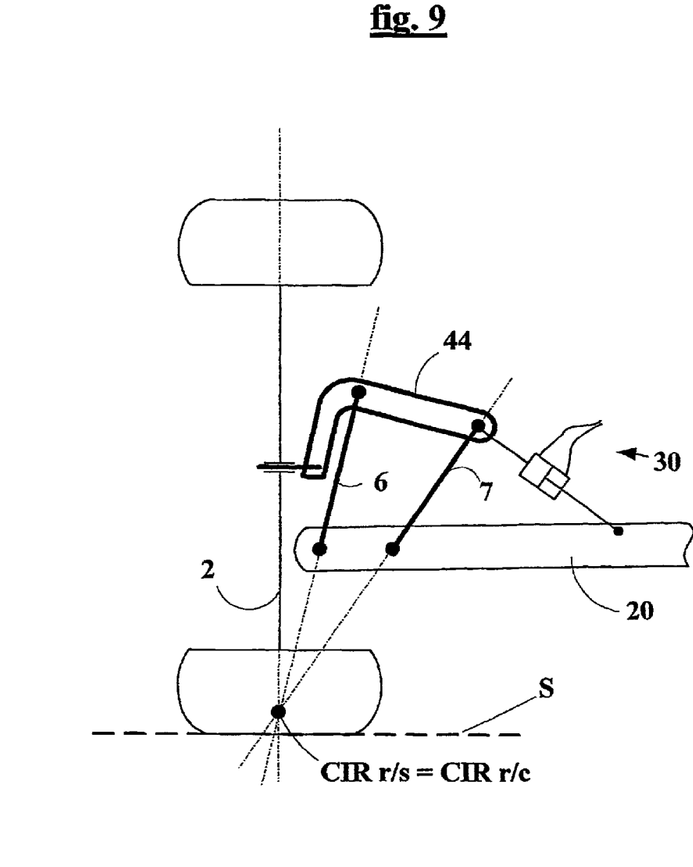
FIG. 9 is a schematic diagram according to a seventh embodiment of the invention.

FIG. 9 represents the case of a rigid axle (or a swinging axle or swinging half-axle), as is found in some passenger cars and most utility vehicles. In this case, the rigid axle 20 constitutes the intermediate support, and its connection (not represented) to the body of the vehicle provides the suspension spring movement. According to the invention, the wheel carrier 44 is connected by means of two connection rods 6, 7 to the rigid axle 20, so as to define a first instantaneous center of rotation (CIR r/s) of the movement of the wheel carrier 44 relative to the axle/intermediate support 20 at a location slightly above the ground S. In this position, the second instantaneous center of rotation (CIR r/c) of the movement of the wheel carrier 44 relative to the body 5 of the vehicle is combined with the first instantaneous center of rotation (CIR r/s) of the movement of the wheel carrier 44 relative to the axle 20, since the latter is situated in the plane of the wheel PR. A jack 30 makes it possible to control actively the movements of the wheel carrier 44 relative to the suspension. This jack 30 can be controlled according to running parameters of the vehicle. It will be appreciated that this alternative is not limited to the case in FIG. 9, but can be adapted to other embodiments.

Figure 10:
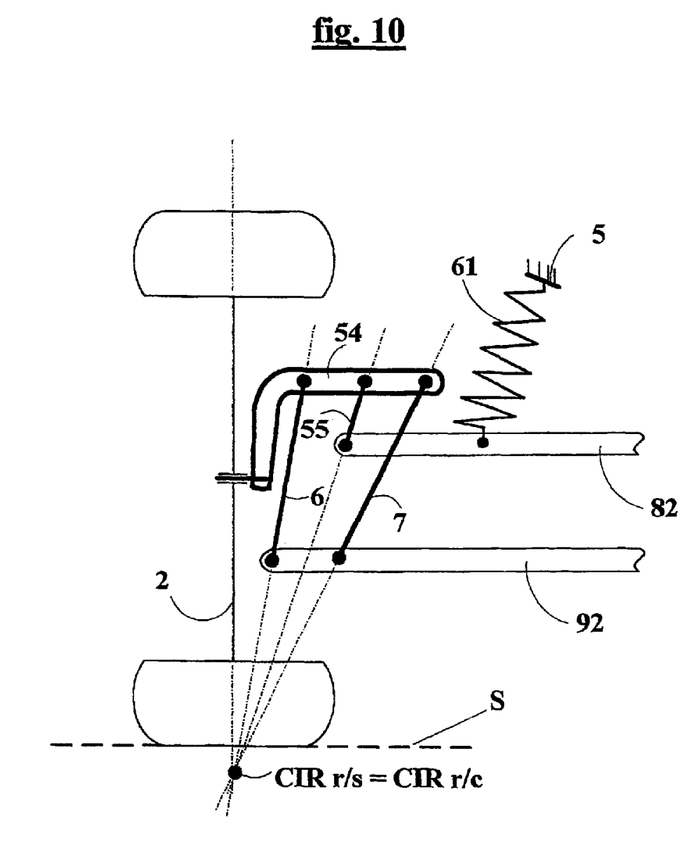
FIG. 10 is a schematic diagram according to an eighth embodiment of the invention.

FIG. 10 shows an embodiment of the invention in which the wheel carrier 54 is articulated by connection rods 6, 7 to the lower arm or triangle 92 of a "multi-arm" or "double triangle" suspension system. The upper arm or triangle 82, which supports the spring 61, is articulated by an additional connection rod 55. This additional connection rod 55 is oriented towards the first instantaneous center of rotation (CIR r/s), in order to have an neutral effect on the camber (in the mean position of the wheel). In this position, the second instantaneous center of rotation (CIR r/c) of the movement of the wheel carrier 54 relative to the body of the vehicle is combined with the first instantaneous center of rotation (CIR r/s), as described in FIG. 2.

As has been seen, according to the functioning required, it is possible to select a position of the second instantaneous center of rotation of the camber movement (CIR r/c) in an interval ranging from 0.5 R above the ground to R beneath the ground (R being the radius of the wheel). The fact of positioning this point near to the ground makes it possible to limit the track variation. For example, in the case of an instantaneous center of rotation which is situated at R from the ground, and for a wheel with a radius R of 300 mm, a camber of 5° gives rise to offsetting of the contact area relative to the body (half-track variation) of approximately 25 mm. It has been found that this value must be considered as a limit not to be exceeded. However, when the second instantaneous center of rotation of the camber movement (CIR r/c) is situated above the ground, i.e., the device according to the invention must comprise an actuator in order to orient the plane of the wheel PR actively (see FIGS. 5 and 9), experiments have shown that beyond a certain height, the power which is necessary for this active functioning makes the system too complex, and in particular makes it consume too much energy. This limit height has been found to correspond substantially to a half-radius of a wheel.

In cases of passive functioning, as previously described, a means for verifying the functioning of the device according to the invention (and of measuring its stability) consists of exerting a transverse force (for example, by means of a plate bearing) at the level of the contact area of the wheel of a vehicle equipped with the device according to the invention, and of measuring the variation of the camber angle.

The different examples in the figures illustrate the fact that the suspension device according to the invention can be constructed on the basis of very different suspension principles, provided that the required kinematic definition is obtained. In particular, the elements which are represented in arbitrary forms can have any suitable form, which makes it possible to position the axes of articulation adequately, and, it will be appreciated, to withstand the stresses of the suspension system. Furthermore, the figures represent cases in which the articulation of the wheel carrier relative to the intermediate support is a "virtual" articulation around the first instantaneous center of rotation (CIR r/s); i.e. it does not take the form of a mechanical shaft, but is derived from the articulation of several elements. The fact that this articulation is virtual makes it possible to position the center of this rotation at any point on the plane, and in particular in the vicinity of the ground or even beneath the ground. A mechanical articulation, i.e., a "non-virtual" articulation such as a shaft, can however be used when the position of the first instantaneous center of rotation (CIR r/s) is compatible in terms of space available and ground clearance.

An advantageous feature of the invention is that it is applicable to all of the known suspension systems, since there are added to these existing systems additional elements which permit a degree of freedom of camber in addition to the existing degree of freedom of suspension. An advantage of this support or suspension device is its compactness, which makes it possible not to adapt the design of vehicles which are currently available. One of the substantial characteristics of the invention is that it permits variation of the camber of each wheel, independently of the other wheels of the vehicle, and irrespective of whether the wheel is a drive wheel or a driven wheel.

The figures represent the principles, and a plurality of embodiments of the invention, in projection on a plane which is at right-angles to the ground and transverse relative to the vehicle and which passes through the point of application of the sum of the forces in the contact area. This two-dimensional representation is advantageous in order to illustrate clearly the substantial characteristics of the invention, the object of which is the controlled variation of the camber. In this representation, the camber movement is a rotation in the plane around a point of pivoting (instantaneous center of rotation). It should not be forgotten, however, that in reality rotation is carried out (in three dimensions) around a real or virtual axis of pivoting (instantaneous axis of rotation). This axis is represented by a point in the flat representation. This axis can be constructed substantially parallel to the plane of the ground and to the longitudinal axis of the vehicle, in order to permit the required variations of camber. By varying the orientation of this axis, it is possible, in addition to the camber effects, to create additional effects of steering, toe-in, toe-out or spin angle, according to the transverse forces (curve) and longitudinal forces (braking, acceleration) sustained by the wheel in the contact area. By carrying out tests and/or by means of theoretical methods, persons skilled in the art can determine the orientation to be adopted according to the performance which they require from this device. For example, experiments have shown that an inclination of 6° of this axis of pivoting of camber relative to the horizontal makes it possible to induce steering which is associated with the camber, but according to an angle which is 10 times smaller than that of the camber. Thus, when the transverse forces induce a camber of 5°, the induced steering is approximately 0.5°. The inclination of the axis of pivoting can be obtained, for example, by equipping the vehicle with a device the plane of functioning of which is inclined by 6° relative to the vertical.

The articulations of the different elements of the support device or of the suspension device according to the invention can be produced in different ways. The elastomeric articulations which are commonly used in the field of connection to the ground can make it possible to simplify obtaining the equilibrium of the system, since they introduce pre-determined rigidity. Furthermore, it is known that they assist the comfort of the vehicle.

The support device or the suspension device according to the invention can be implemented in order to compensate for the deformations of the elements of the connection to the ground of the vehicles which are currently available, and can permit improved performances. In other words, the support device or the suspension device according to the invention can be used to guarantee that, in all circumstances, the plane of the wheel continues to be substantially at right-angles to the plane of the ground, or slightly inclined, in order to take into account also any deformation of the tire. This object is achieved by a device the amplitude of useful camber of which is only a few degrees. The support device or the suspension device according to the invention, however, can also be implemented in order to permit far greater variation of the camber, i.e., to permit functioning of the chassis which is closer to that of a motor cycle than to that of vehicles with three wheels or more, which are available at present on the market.

In general, the figures represent a wheel 2 comprising a pneumatic tire, but it will be appreciated that the invention also applies to any type of wheel, with or without a resilient pneumatic or non-pneumatic tire, a substantial characteristic being the position of the instantaneous center of rotation relative to the contact area, whatever this may be.

Although the invention has been described and illustrated herein by reference to specific embodiments thereof, it will be understood that such embodiments are susceptible of variation and modification without departing from the inventive concepts disclosed. All such variations and modifications, therefore, are intended to be encompassed within the spirit and scope of the appended claims.

What is claimed is:

1. A vehicle suspension device for suspending a wheel of radius R on a vehicle body with independent degrees of freedom of camber movement transversely of the longitudinal direction of the vehicle body and suspension movement vertically of the vehicle body, comprising;

a wheel carrier for supporting the wheel;

an intermediate support;

at least two vertically spaced apart, generally horizontally extending suspension arms pivotally coupled at the inner ends thereof to the vehicle body and at the outer ends thereof to the intermediate support for movement in a generally vertical direction to provide a degree of freedom of suspension movement of the intermediate support relative to the vehicle body;

a pair of horizontally spaced apart, generally vertically extending connection rods pivotally connected at the lower ends thereof to the intermediate support and at the upper ends thereof to the wheel carrier for movement in a plane generally transverse to the longitudinal direction of the vehicle body to provide a degree of freedom of camber movement of the wheel carrier relative to the intermediate support; and said connection rods being configured such that they converge in the downward direction and such that the camber movement of the wheel carrier relative to the intermediate support occurs about a first instantaneous center of rotation located within an interval ranging from 0.5 R above the ground surface to R beneath the ground surface.

2. The vehicle suspension device according to claim 1, in which the connection rods are configured such that said first instantaneous center of rotation is situated beneath the ground.

3. The vehicle suspension device according to claim 1, in which the connection rods are configured such that said first instantaneous center of rotation is situated in a position relative to the center of the wheel which forms an angle of less than 15° with the central plane (PR) of the wheel.

4. The vehicle suspension device according to claim 1, in which the connection rods are configured such that said first instantaneous center of rotation is situated essentially in the central plane (PR) of the wheel.

5. The vehicle suspension device according to claim 1, further comprising means for controlling the variation in camber movement of the wheel carrier relative to the intermediate support.

6. The vehicle suspension device according to claim 5, in which the camber movement controlling means comprises means for passively controlling the variation in camber movement of the wheel carrier in response to a transverse force exerted by the ground on the wheel.

7. In a vehicle having a wheel of radius R and a suspension device for suspending the wheel on the vehicle body, the improvement in the suspension device comprising;

a wheel carrier for supporting the wheel;

an intermediate support;

at least two vertically spaced apart, generally horizontally extending suspension arms pivotally coupled at the inner ends thereof to the vehicle body and at the outer ends thereof to the intermediate support for movement in a generally vertical direction to provide a degree of freedom of suspension movement of the intermediate support relative to the vehicle body;

a pair of horizontally spaced apart, generally vertically extending connection rods pivotally connected at the lower ends thereof to the intermediate support and at the upper ends thereof to the wheel carrier for movement in a plane generally transverse to the longitudinal direction of the vehicle body to provide an independent degree of freedom of camber movement of the wheel carrier relative to the intermediate support; and said connection rods being configured such that they converge in the downward direction and such that the camber movement of the wheel carrier relative to the intermediate support occurs about a first instantaneous center of rotation located within an interval ranging from 0.5 R above the ground surface to R beneath the ground surface.

8. The vehicle according to claim 7, in which the connection rods are configured such that said first instantaneous center of rotation is situated beneath the ground.

9. The vehicle according to claim 7, in which the connection rods are configured such that said first instantaneous center of rotation is situated in a position relative to the center of the wheel which forms angle of less than 15° with the central plane (PR) of the wheel.

10. The vehicle according to claim 7, in which the connection rods are configured such that said first instantaneous center of rotation is situated essentially in the central plane (PR) of the wheel.

11. The vehicle according to claim 7, further comprising means for controlling the variation in camber movement of the wheel carrier relative to the intermediate support.

12. The vehicle according to claim 11, in which the camber movement controlling means comprises means for passively controlling the variation in camber movement of the wheel carrier in response to a transverse force exerted by the ground on the wheel.

* * * * *